United States Patent
Chang et al.

(10) Patent No.: US 7,336,398 B2
(45) Date of Patent: Feb. 26, 2008

(54) ERROR PREDICTION METHOD FOR HALFTONE PROCESSING

(75) Inventors: Hui-Huang Chang, Cyonglin Township, Hsinchu County (TW); Hsin-Ying Ou, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 754 days.

(21) Appl. No.: 10/827,150

(22) Filed: Apr. 19, 2004

(65) Prior Publication Data

US 2004/0263910 A1    Dec. 30, 2004

(30) Foreign Application Priority Data

Jun. 24, 2003    (TW) .............................. 92117169 A

(51) Int. Cl.
*H04N 1/405*  (2006.01)
*G06K 15/00*  (2006.01)

(52) U.S. Cl. .............. 358/3.03; 358/3.06; 358/1.9; 358/3.05; 382/252; 382/232

(58) Field of Classification Search .............. 358/3.03, 358/3.06, 1.9, 3.05; 382/252, 232
See application file for complete search history.

(56) References Cited

FOREIGN PATENT DOCUMENTS

| JP | 06-301364 | * | 10/1994 |
| JP | 06301364 A | * | 10/1994 |
| JP | 11-146202 | * | 5/1999 |
| JP | 11146202 A | * | 5/1999 |

* cited by examiner

*Primary Examiner*—King Y. Poon
*Assistant Examiner*—Quang N. Vo
(74) *Attorney, Agent, or Firm*—Thomas, Kayden, Horstemeyer & Risley

(57) ABSTRACT

An error diffusion method applied to halftone processing for image data. The image data comprise a plurality of pixels. The method comprising the steps of dividing the image data into a plurality of image blocks; selecting one of the pixels belonging to each of the image blocks as a target pixel, wherein the target pixel is located on the boundary of the corresponding image block; assigning a predicted error to the target pixel; and executing the error diffusion method on the rest of the pixels of the image blocks according to the predicted error of the target pixels of the image blocks. When the error diffusion is performed, target pixels are found in the image block and then predicted errors are assigned to the target pixels in order to calculate their output values. The target pixels are located at boundaries of the image blocks, and the predicted errors may be 0 or the transversal or longitudinal errors outputted from the pixels above the target pixels.

16 Claims, 2 Drawing Sheets

ERROR PREDICTION METHOD FOR HALFTONE PROCESSING

This application claims the benefit of Taiwan application Serial No. 092117169, filed Jun. 24, 2003, the subject matter of which is incorporated herein by reference.

BACKGROUND OF THE INVENTION

1. Field of the Invention

The invention relates to a numerical prediction method, and more particularly to an error prediction method.

2. Description of the Related Art

In an image processing system, the image data often has to be halftone-processed in order to meet various demands of the output apparatuses. Taking a 24-bit image (true color) as an example, the gray-scale values of the red (R), green (G), and blue (B) pixels are represented by 8 bits. However, this representation cannot be directly displayed or printed. For example, each color in the LCD (liquid crystal display) only has 6 bits, and each color for printing only has one bit (three bits are used in an advanced printer). Consequently, the image processing system often needs to convert the image data with a higher bit number (e.g., 8) into another image data with a lower bit number (e.g., 6 or 3), which is the so-called halftone processing.

In the typical halftone processing, the gray-scale value of the pixel is compared to a threshold value. "1" is outputted if the gray-scale value is greater than the threshold value, or otherwise "0" is outputted. Although the method can be easily performed, image distortion may be caused because the error is too large. One of the improved methods is to diffuse the error of each pixel to the adjacent pixels according to a certain proportion, and thus the errors diffused from other pixels also have to be considered when the gray-scale values of the adjacent pixels are calculated. Therefore, the overall error is reduced, and the method is called as the error diffusion method.

FIG. 1 is a schematic illustration showing the error diffusion method. The pixels P11, P12 and P21 are adjacent to one another. According to the error diffusion principle, the error of the pixel P11 may be diffused to the pixels P12 and P21 according to a certain proportion (e.g., 50%), respectively. When the gray-scale values of the pixels P12 and P21 are calculated, the diffused errors from the pixel P11 have to be considered. In order to make the error diffusion condition be easily distinguished, the error of the pixel outputted along the horizontal axis (x-axis) direction is referred to as a transversal error EX, and the error of the pixel outputted along the vertical axis (y-axis) direction is referred to as a longitudinal error EY.

FIG. 2 shows the implementation condition of the error diffusion method for the image data. The image data 200 is a full image composed of plural adjacent image rows, wherein only two rows are representatively illustrated in the drawing. If the resolution of the image data 200 is 1024× 768, it means that the image data has 768 image rows, and each image row has 1024 pixels. When the error diffusion method is performed, the errors of the pixels in each image row will be sequentially diffused along the error diffusion direction. After the errors of all of the pixels have been diffused, the error diffusion for the next image row is performed. Taking this figure as an example, the error of the pixel A in the image row 210 is diffused rightward to the pixel B, the error of the pixel B is calculated by considering the error from the pixel A, and then the calculated error is diffused to the next pixel. The error of each pixel in the image row 210 is generated and diffused outward in this way. After the calculation of the last pixel M is completed, the error diffusion for the image row 220 is performed. The core of the prior art method is to switch to a next image row for the error diffusion operations after all pixels in each image row have been completely diffused. That is, the image row serves as the calculation unit, or the method may be called as a line-based method.

It is to be noted that the transversal error of each pixel is generated and diffused along the horizontal axis, and the longitudinal error of each pixel is also generated and diffused along the vertical axis. Because the error diffusion has to be performed row by row, the transversal error may be immediately processed after it is diffused to the next pixel, but the longitudinal errors have to be temporarily stored to a memory in advance and the longitudinal errors of the previous image row are considered after the errors of the next image row are calculated. Taking FIG. 1 as an example, the longitudinal error of the pixel P11 has to be stored in advance, and then be considered when the error of the pixel P21 is calculated. Consequently, the system needs a large memory to store the longitudinal errors of all pixels in a whole image row, which is quite uneconomic to the hardware usage.

SUMMARY OF THE INVENTION

It is therefore at least an object of the invention to provide an error prediction method capable of solving the problem of calculating the output value when the error of the pixel is unknown.

The invention achieves the above-identified object by providing an error diffusion method applied to halftone processing for image data. The image data comprising a plurality of pixels. The method comprising the steps of dividing the image data into a plurality of image blocks; selecting one of the pixels belonging to each of the image blocks as a target pixel, wherein the target pixel is located on the boundary of the corresponding image block; assigning a predicted error to the target pixel; and executing the error diffusion method on the rest of the pixels of the image blocks according to the predicted error of the target pixels of the image blocks.

In this error prediction method, the image processing direction is not restricted to the conventional horizontal direction. Instead, the vertical direction processing also may be implemented. In addition, multiple image blocks also may be processed simultaneously as long as the pixels on the boundaries of the image blocks are set as the target pixels and the output values thereof are calculated using the error prediction method.

Other objects, features, and advantages of the invention will become apparent from the following detailed description of the preferred but non-limiting embodiments. The following description is made with reference to the accompanying drawings.

DETAILED DESCRIPTION OF THE INVENTION

In the above-mentioned error diffusion method, when the output value of some pixel is calculated, the errors diffused from an above pixel and a previous pixel have to be known. In some situations, however, the output values of some pixels have to be calculated when the errors diffused from the outside are not calculated or obtained. At this time, the invention provides an error prediction method for predicting errors of previous points with respect to these pixels so as to successfully generating the errors thereof and diffusing the errors outward. The pixels that have to be predicted the errors are referred to as target pixels. Of course, in terms of the image data of the entire frame, the number of the target pixels cannot be too great; otherwise the precision of the error diffusion method will be lost, thereby causing the image distortion. In the following, four embodiments for error prediction will be illustrated for explaining the application chances of this invention.

In a first embodiment, if the output sequence for the calculated errors is from left to right of each image row and then row by row, when the leftmost pixel in each row is calculated, a previous point with respect to the pixel does not exist and its output error has to be predicted or assumed because the leftmost pixel is an initial point. Similarly, when the error of the first image row is calculated, the errors of the previous pixels of the previous image row with respect this image row do not exist and have to be predicted.

In a second embodiment, if there are N sets of mechanisms for calculating the output values, the N rows of output values may be calculated from left to right simultaneously. As for any one of the N rows, a previous above row of errors has to be referred, so the errors of the n-th row cannot be calculated until the errors of the (n−1)th row have been calculated, and the error prediction of the leftmost pixel of each row is the same as that of the first embodiment.

In a third embodiment, when the error diffusion method is performed, the frame looks like specific textures because the proportion of the error diffusion is constant. In order to eliminate the phenomenon, inverse diffusion directions for the odd rows and even rows may be adopted. If the odd row is diffused rightward and the even row is diffused leftward, the error predictions of the previous pixels have to be made in the leftmost pixel of the odd row and the rightmost pixel of the even row.

Figure 1:
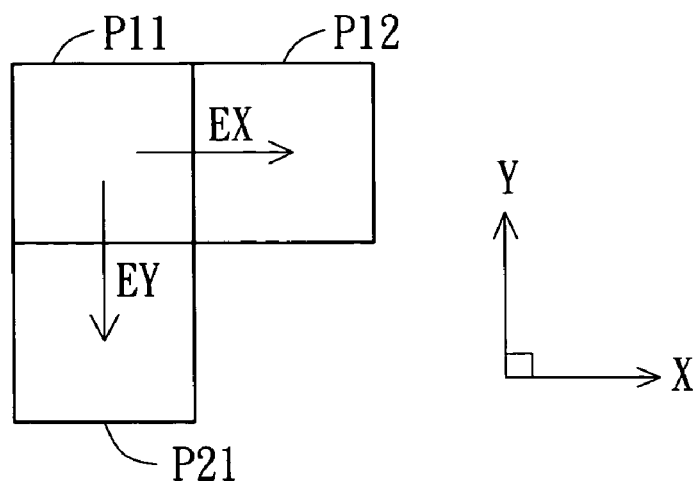
FIG. 1 is a schematic illustration showing the error diffusion method.
Figure 2:
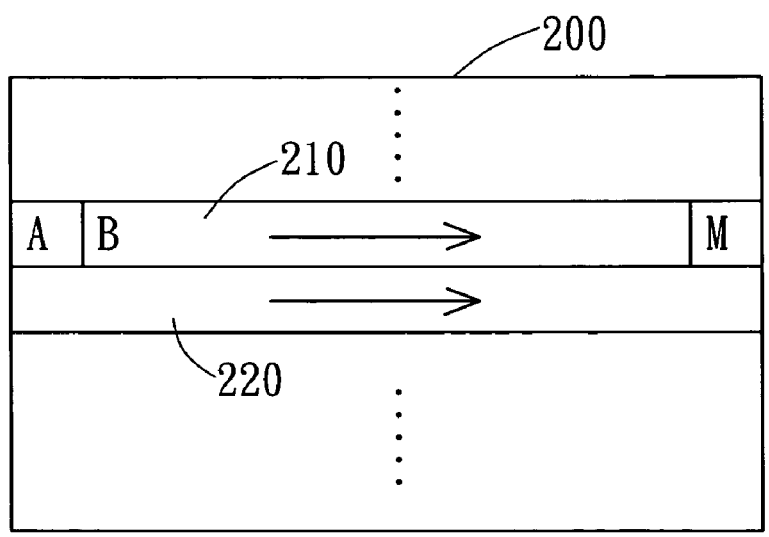
FIG. 2 shows the implementation condition of the error diffusion method for the image data.
Figure 3:
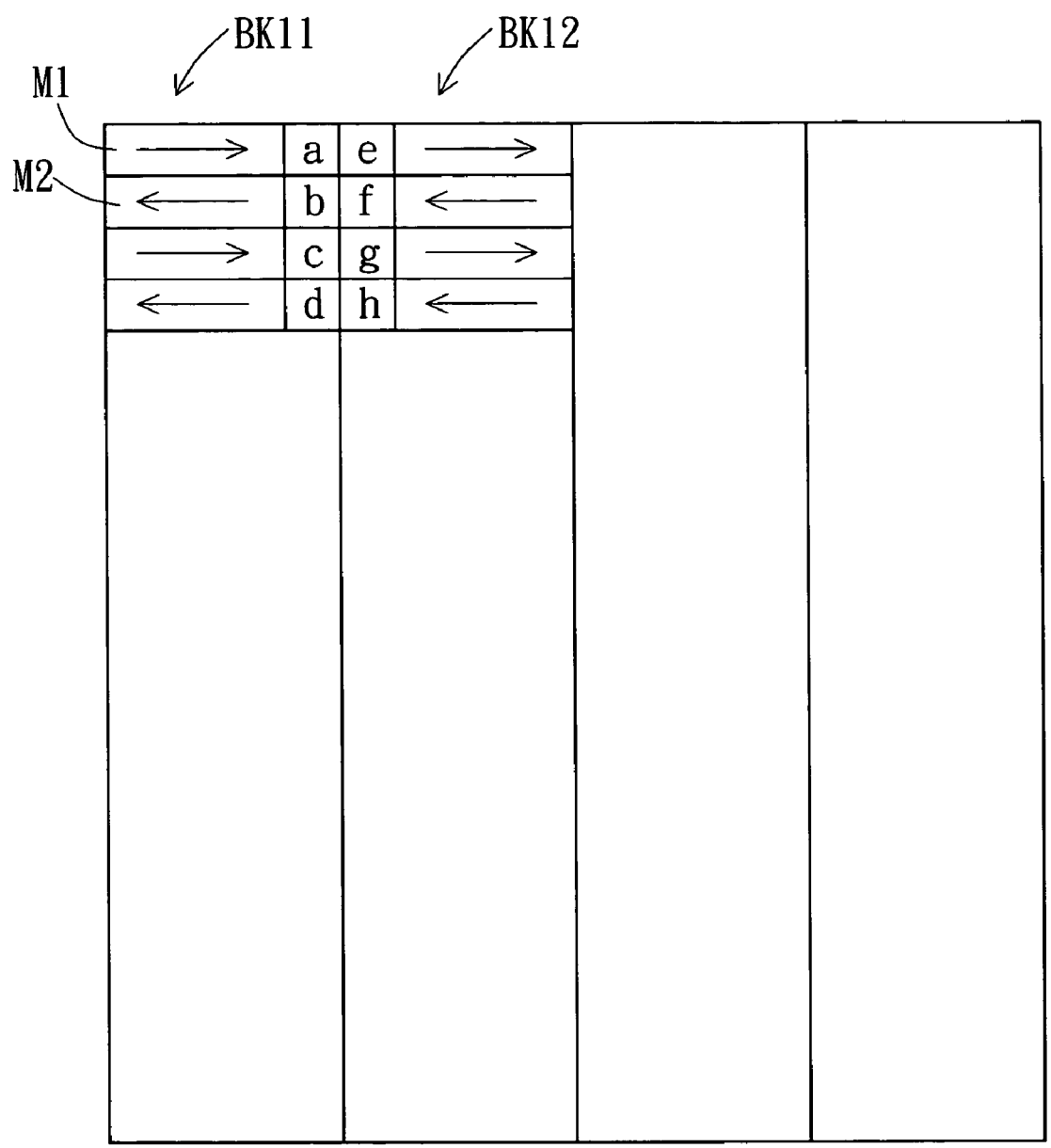
FIG. 3 is a schematic illustration showing the image data according to one preferred embodiment of the invention.

In a fourth embodiment, if the image data is divided into several image blocks and each image block serves as a calculation unit for error diffusion, then the left and right boundaries of each block encounter the problem of error prediction. At this time, the precision of the error prediction directly influences the quality of the overall frame. FIG. 3 is a schematic illustration showing the image data according to one of the preferred embodiments of the invention. The image data 300 may be defined as several image blocks, and the output of the image block is calculated after the output of the previous image block has been calculated. Taking the image blocks BK11 and BK12 as an example, each block has several (four in this example) image rows, and the error of each pixel in each image row is diffused along the arrow direction. Because the calculation unit of the error diffusion is one image block, the error diffusion has to be turned to a next row after the error of the last pixel of the image row has been calculated. For example, after the output of the last pixel "a" in the image row M1 has been calculated, the output of the pixel "b" in the image row M2, rather than the output of the pixel "e" in the image block BK12, has to be calculated.

When the error is predicted, the target pixel of each image block has to be decided in advance, and then the predicted error is assigned to the target pixel. The most convenient and quick way is to set the predicted error to "0", which is very reasonable for the first to third embodiments. However, setting the predicted error to "0" may sometimes cause unsmooth connections between boundaries of the image blocks in the fourth embodiment. One way for solving this problem is to set the predicted error as the error of the adjacent to the target pixel in either transversal or longitudinal direction, such as the pixel above the target pixel, wherein the pixel above the target pixel is located on an image row above the target pixel. For example, if the error of pixel "b" is the first point to be calculated in the image row M2 but the error of pixel "f" is not calculated and cannot be diffused to the pixel "b", the error of pixel "a" serves as the predicted error to be diffused to the pixel "b". Thus, the error may be diffused leftward from the starting pixel "b" in the image row M2, wherein the pixel "b" is the so-called target pixel and the pixel "a" is the so-called the last pixel. In the image block BK12, because the to-be-received transversal errors for the first pixels (pixel e, pixel g) from left to right have been calculated from (pixel a, pixel c) in the image block BK11, no prediction has to be made.

It is to be noted that although the embodiments are illustrated according to the error diffusion in the horizontal direction, the field of the error prediction methods cannot be restricted to the horizontal direction. Instead, the error diffusion in the vertical direction also may be implemented. In addition, it is possible to process multiple image blocks simultaneously so as to speed up the image processing speed. In this case, the processing may be performed only by prescribing the target pixel of the boundary of each image block and then calculating the error output value of each target pixel using the error prediction method.

While the invention has been described by way of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An error diffusion method applied to halftone processing for image data, the image data comprising a plurality of pixels, the method comprising the steps of:
   dividing the image data into a plurality of image blocks;
   for each of the image blocks, selecting one of the pixels belonging to the image block being processed as a target pixel and as a starting pixel from which an error diffusion calculation is to be executed in a direction across the image block, wherein the target pixel is located on a boundary of the image block;
   assigning a predicted error to the target pixel, wherein the predicted error is determined according to at least an error diffused from a last pixel which is adjacent to the target pixel, wherein the last pixel and the target pixel do not belong to the same image block; and
   executing the error diffusion calculation on the rest of the pixels of the image blocks in the direction across the image block according to the predicted error of the target pixels of the image blocks.

2. The method according to claim 1, wherein in the step of assigning, the predicted error is assigned to be 0 when the last pixel is not obtained.

3. The method according to claim 1, wherein the last pixel is adjacent to the target pixel in either a transversal or a longitudinal direction.

4. The method according to claim 3, wherein the image data is divided into the image blocks according to the location of the image blocks.

5. An error diffusion method applied to halftone processing for image data, the error prediction method comprising the steps of:
dividing the image data into a plurality of image blocks, wherein each of the image blocks comprises a plurality of image rows, each of which comprises a plurality of pixels, and each of the pixels at least outputs an error;
for each of the image blocks, selecting one of the pixels belonging to one of the image rows of the image block being processed as a target pixel and as a starting pixel from which an error diffusion calculation is to be executed in a direction along the one of the image rows, wherein the target pixel is located on a boundary of the image block;
assigning a predicted error of the target pixel, wherein the predicted error is determined according to at least an error diffused from a last pixel which is adjacent to the target pixel, wherein the last pixel and the target pixel do not belong to the same image block; and
executing the error diffusion calculation on the rest of the pixels of the one of the image rows of the image blocks in the direction along the one of the image rows according to the predicted error of the target pixels of the image blocks.

6. The method according to claim 5, wherein the step of assigning is to assign the predicted error to be 0 when the last pixel is not obtained.

7. The method according to claim 5, wherein the last pixel is adjacent to the target pixel in either a transversal or a longitudinal direction.

8. An error diffusion method applied to halftone processing for image data, the image data comprising a plurality of pixels, the method comprising the steps of:
dividing the image data into a plurality of image blocks, wherein each of the image blocks comprises a plurality of image rows, each of which comprises a plurality of pixels;
for each of the image blocks, performing error diffusion of the image rows of the image block being processed in alternate directions, the performing step comprising:
selecting a first one of the pixels belonging to a first one of the image rows of the image block being processed as a first target pixel and as a starting pixel from which an error diffusion calculation is to be executed in a first direction along the first one of the image rows, wherein the first target pixel is located on a boundary of the image block;
assigning a first predicted error to the first target pixel;
executing the error diffusion calculation on the rest of the pixels of the first one of the image rows according to the first predicted error of the first target pixel in the first direction along the first one of the image rows;
selecting a second one of the pixels belonging to a second one of the image rows of the image block being processed as a second target pixel and as a starting pixel from which an error diffusion calculation is to be executed in a second direction along the second one of the image rows, wherein the second target pixel is located on a boundary of the image block;
assigning a second predicted error to the second target pixel; and
executing the error diffusion calculation on the rest of the pixels of the second one of the image rows according to the second predicted error of the second target pixel in the second direction along the second one of the image rows;
wherein the first direction is the opposite of the second direction.

9. The method according to claim 8, wherein the first one of the image rows is an odd row of the image block and the second one of the image rows is an even row of the image block.

10. The method according to claim 8, wherein the first one of the image rows is an even row of the image block and the second one of the image rows is an odd row of the image block.

11. The method according to claim 8, wherein in the step of assigning a first predicted error to the first target pixel, the first predicted error is determined according to at least an error diffused from a last pixel which is adjacent to the first target pixel, wherein the last pixel and the first target pixel do not belong to the same image block.

12. The method according to claim 11, wherein in the step of assigning a first predicted error to the first target pixel, the first predicted error is assigned to be a fixed value when the last pixel is not obtained.

13. The method according to claim 11, wherein the last pixel is adjacent to the target pixel in either a transversal or a longitudinal direction.

14. The method according to claim 8, wherein in the step of assigning a second predicted error to the first target pixel, the second predicted error is determined according to at least an error diffused from a last pixel which is adjacent to the second target pixel, wherein the last pixel and the second target pixel do not belong to the same image block.

15. The method according to claim 14, wherein in the step of assigning a second predicted error to the second target pixel, the second predicted error is assigned to be a fixed value when the last pixel is not obtained.

16. The method according to claim 14, wherein the last pixel is adjacent to the target pixel in either a transversal or a longitudinal direction.

* * * * *